(12) United States Patent
Pedersen et al.

(10) Patent No.: US 9,594,699 B2
(45) Date of Patent: Mar. 14, 2017

(54) ADDITIONAL SECURITY IN FLASHLESS MODEM

(71) Applicant: Intel Corporation, Santa Clara, CA (US)

(72) Inventors: Carsten Pedersen, Santa Clara, CA (US); Rasmus Jensen, Gistrup (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/664,507

(22) Filed: Mar. 20, 2015

(65) Prior Publication Data

US 2016/0275021 A1  Sep. 22, 2016

(51) Int. Cl.
*G06F 21/64* (2013.01)
*G06F 12/14* (2006.01)
*G06F 3/06* (2006.01)

(52) U.S. Cl.
CPC ........ *G06F 12/1483* (2013.01); *G06F 3/0622* (2013.01); *G06F 3/0637* (2013.01); *G06F 3/0679* (2013.01); *G06F 2212/1052* (2013.01)

(58) Field of Classification Search
CPC ............ H04L 9/32; H04L 63/12; G06F 21/60
See application file for complete search history.

(56) References Cited

U.S. PATENT DOCUMENTS

| 5,859,911 A * | 1/1999 | Angelo | G06F 12/1408 711/E12.092 |
| 6,640,334 B1 * | 10/2003 | Rasmussen | G06F 9/4401 717/169 |
| 2012/0226900 A1 * | 9/2012 | Rodgers | G06F 21/10 713/150 |

* cited by examiner

*Primary Examiner* — Izunna Okeke
(74) *Attorney, Agent, or Firm* — Schwegman Lundberg & Woessner, P.A.

(57) ABSTRACT

Various systems and methods for implementing additional security in a flashless modem are described herein. A modem system for implementing additional security in a flashless modem, the modem system comprising: local storage; non-volatile random access memory (NVRAM); and an access control module to: read non-volatile memory data (NVM data) from the local storage; calculate a hash of the NVM data; access a previously-stored hash; compare the hash of the NVM data with the previously-stored hash to produce a comparison; and control access to the NVM data based on the comparison.

23 Claims, 5 Drawing Sheets

ADDITIONAL SECURITY IN FLASHLESS MODEM

TECHNICAL FIELD

Embodiments described herein generally relate to secure processor operation and in particular, to a system for additional security in a flashless modem.

BACKGROUND

Mobile phone architectures generally include several primary components including an applications processor, a cellular modem subsystem, and memory. Other subsystems such as sensors, battery and power management, cameras, and displays may be controlled via the applications processor.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system for additional security in a flashless modem. Modems may be manufactured with or without flash memory. Modems may be manufactured without flash memory (e.g., flashless modems) to reduce the printed circuit board (PCB) size, reduce the complexity of circuitry, reduced component costs, reduced mounting costs, reduced distribution costs, etc. A flashless modem may allow for increased flexibility because the modem's firmware is loaded into the flash memory during boot. In this manner, the modem may be easily reconfigured with different firmware or other operational software from boot-to-boot. However, use of a flashless modem may decrease security. Modem configuration information that is stored on the host side (e.g., in application processor file system), may be tampered with before it is sent to the modem during the modem's boot sequence. This may change the modem's behavior for malicious or nefarious means.

The present disclosure discusses an improvement to the security in a flashless modem system. Such modem systems may be found in various mobile devices, such as mobile phones, tablets, personal digital assistants, laptops, and the like.

Figure 1:
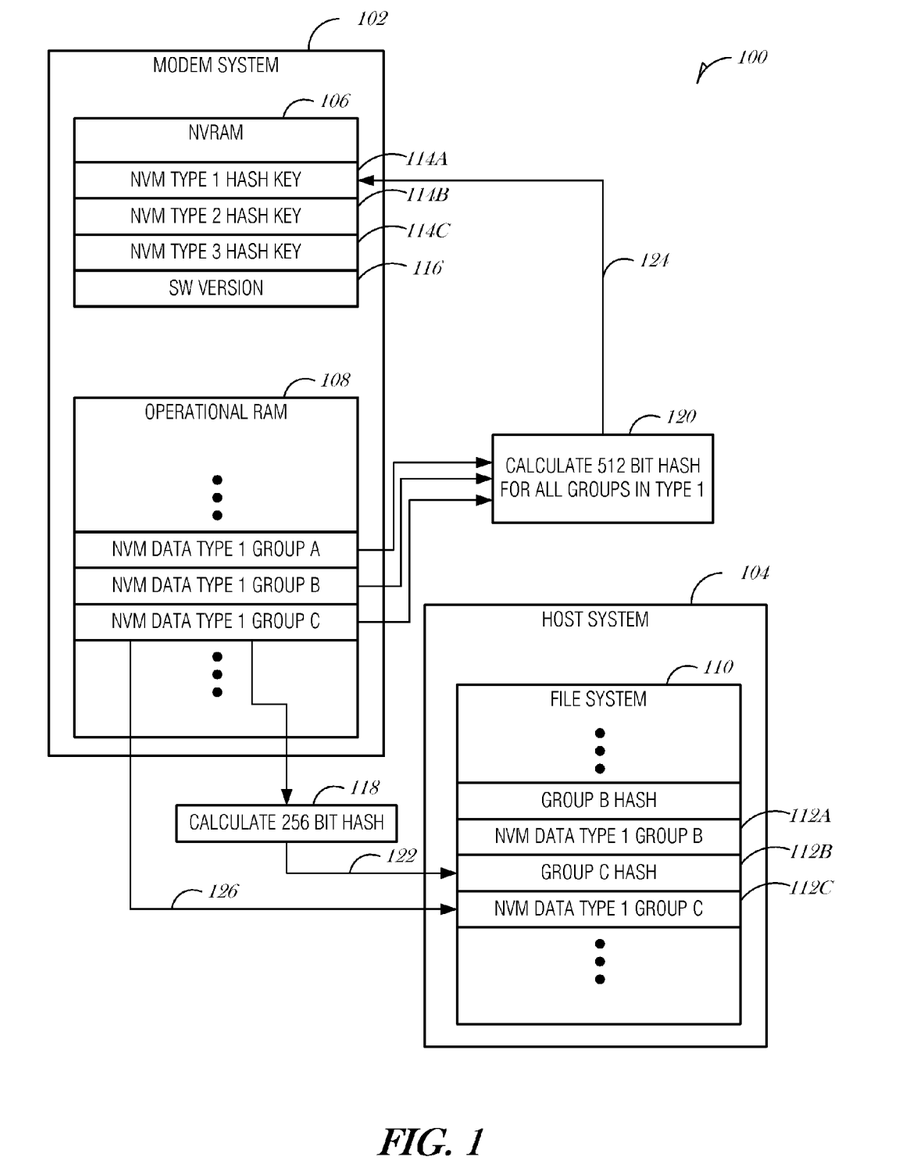
FIG. 1 illustrates an architecture according to an embodiment.

FIG. 1 illustrates an architecture 100 according to an embodiment. The architecture 100 includes a modem system 102 and a host system 104. The modem system 102 may be a cellular modem system. The modem system 102 includes a non-volatile random access memory (NVRAM) 106 and operational random access memory (RAM) storage 108. The NVRAM 106 may be an erasable programmable read-only memory (e.g., EPROM or EEPROM) or a flash memory, in various embodiments. The operational RAM storage 108 may be any type of volatile memory, such as dynamic RAM (DRAM) (e.g., double data rate synchronous dynamic RAM (DDR SDRAM)), static RAM (SRAM), or the like.

The host system 104 includes a file system 110, which is stored on a memory device, such as a NVRAM. The file system 110 may be stored in other forms of memory, such as magnetic-based memory (e.g., hard drive), volatile RAM, EPROM or EEPROM, eMMC, or the like. The file system 110 includes operational files 112A, 112B, and 112C. Operational files 112 include the non-volatile memory data for each type of data. In the example illustrated in FIG. 1, there are three types of data: configuration, static, and dynamic. It is understood that more or fewer types of data may be implemented.

As discussed above, a flashless modem may be produced without local non-volatile memory. Without local non-volatile memory, certain configuration data needs to be stored elsewhere. Configuration data includes the modem's calibration data and security data.

When a modem is manufactured, it is understood that the actual performance of each copy of the modem is slightly different due to manufacturing variance. As such, after the modem is manufactured the modem is calibrated to be within a certain specification. The parameters used to calibrate the modem are considered the calibration data. The calibration data is stored and reused to adjust the modem signal power at certain frequencies or to otherwise adjust the modem's operation to ensure that the modem acts as designed.

In addition to calibration data, various security data may be associated with the modem. Security data, such as the cellular phone's unique identification number may be assigned to the mobile telecommunications equipment and the modem at the time of manufacture, production, or sale. The unique identifier may be a manufacturer assigned serial number, an International Mobile Station Equipment Identity (IMEI), mobile equipment identified (MEID), cellular data number (CDN), or integrated circuit card ID (ICCID) number, in various embodiments.

Other security data includes subscriber identity module (SIM) lock information. A SIM lock (also referred to as a simlock, network lock, or subsidy lock), is a capability built into GSM mobile phones by mobile phone manufacturers. This capability allows network providers to restrict the use of specific phones to specific network providers. SIM locked phones are typically locked such that they are able to only accept SIM cards with certain IMSIs, which may be restricted by mobile country code (MCC; e.g., only SIM cards issued in certain countries will work), mobile network code (MNC; e.g., only SIM cards issued by certain network providers will work), or mobile subscriber identification number (MSIN; e.g., only one SIM card with a certain MSIN will work).

Static data may include tuning parameters, which are used to further modify the modem's operation after manufacturing. Tuning may be performed for an entire class of devices to act in a certain way for a certain use case. Other data may be stored as static type data.

Dynamic data may include various real-time operational data, such as information about the neighboring cell at the time of power off. Using the neighboring cell information at the next power up allows the modem to connect to a network quicker. Other data may be stored as dynamic type data.

These three types of non-volatile memory (NVM) data may be stored as one or more groups within each type. The groups may be organized by subsystem or component. Each subsystem or component may have one or more groups for each type of data. For example, a radio frequency (RF) transceiver may be related to one group having each type of NVM data. Operational files 112 for one NVM data type are illustrated in FIG. 1. It is understood that additional NVM data types may be stored in the file system 110.

In operation, the modem system 102 stores hash keys 114A, 114B, 114C in the NVRAM 106. Operational data (e.g., NVM Data Type 1 Group A 112A) is copied from the file system 110 to the operational RAM 108. The hash keys 114 are calculated based on the complete NVM data for a respective NVM type. For example, the NVM Type 1 Hash Key 114A is calculated based on NVM Data Type 1 Group A 112A, NVM Data Type 1 Group B 112B, and NVM Data Type 1 Group C 112C. At every boot, the NVM data in each group is checked against the corresponding hash key. So, for example, the NVM Data Type 1 data 112A, 112B, and 112C, may be analyzed to calculate a hash key for comparison with the stored NVM Type 1 Hash Key 114A. When there is a mismatch between the calculated and stored hash keys, an error may be raised, executed of the software may be halted, or additional remedial activities may be initiated. As such, the present implementation is an improvement over currently existing modems that do not perform a security check on NVM files stored on the host side.

In an embodiment, the NVRAM 106 is at least 200 bytes. Such a small NVRAM unit has a correspondingly small impact on the cost of the modem system 102. A 200 byte NVRAM 106 may be used to store three 512-bit hash keys (e.g., hash key 114A) and an 8 byte software version 116. While a 512-bit hash key is discussed here, it is understood that any length hash key may be used. The NVRAM 106 may be increased or decreased in size to accommodate an increase or decrease in hash key length. Similarly, a larger or smaller software version field may be used.

When data in an NVM group is updated, such as when dynamic operational data is changed, a new hash key is calculated for the group (operation 118) and a new hash key is calculated for the entire NVM data type (operation 120). The hash key for the group is copied to the host system 104 (operation 122). The hash hey for the NVM data type is copied to the NVRAM 106 (operation 124). With a hash key for a certain group/type combination, the modem system 102 or the host system 104 may validate the NVM data group-by-group. Using the NVM Type Hash Key 114, the modem system 102 or the host system 104 may validate the NVM data type-by-type. The new group-level hash key calculation and the type-level hash key calculation may be performed periodically or intermittently, such as on a regular period (e.g., 5 minutes). When the hash keys are recalculated, the NVM data may also be copied to the host system 104 (operation 126) to ensure synchronicity between the operational RAM 108 and the file system 110.

The software version 116 is used to ensure that the NVM data loaded from the host system 104 is at least as recent as the version stored in the software version 116 field. For example, the host system 104 may maintain the latest copy of the software in the file system 110. When the modem system 102 is powered up, the NVM data for each group and type is loaded into operational RAM 108. The modem system 102 checks the software version of this NVM data to ensure that the version is at least as recent as the version stored in the software version 116 field. This mechanism restricts the host system 104 from attempting to roll back to a previous software version. The software version check may be used in combination with the NVM hash key verification or independently from the NVM hash key verification.

Figure 2:
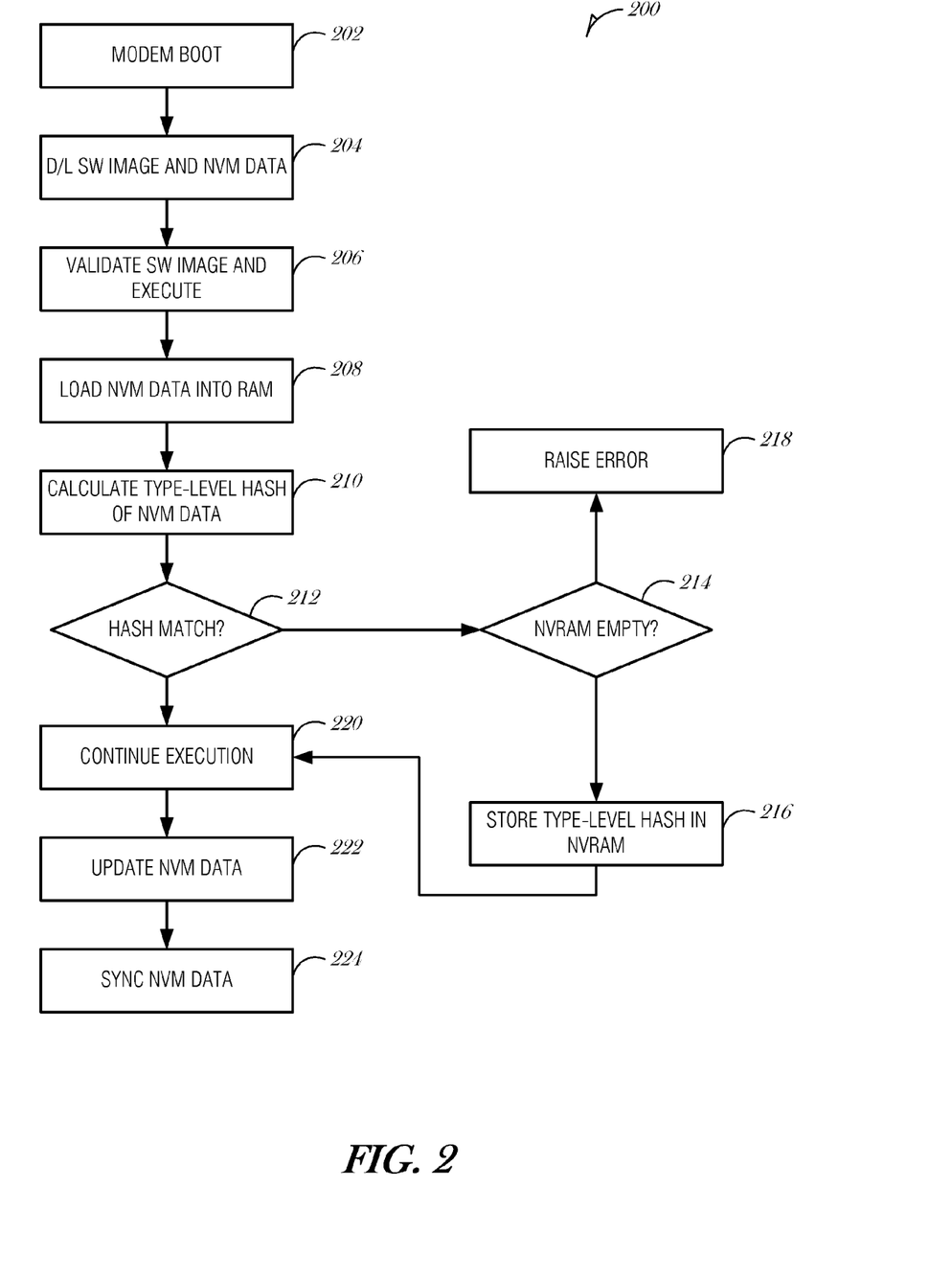
FIG. 2 is a flowchart illustrating control and data flow during modem operation, according to an embodiment.

FIG. 2 is a flowchart illustrating control and data flow during modem operation, according to an embodiment. At operation 202, the modem boots. During the modem boot process a low-level bootrom executes and loads a primary signed image (PSI) into RAM accessible by the cellular modem processor (CP). The RAM may be operational RAM (item 108 from FIG. 1). The primary signed image may be validated by the bootrom. The PSI is then used to download and validate an External Boot Loader (EBL). The EBL establishes a connection to the application processor (AP) to download the software image and NVM data (operation 204). The software image is then validated and executed (operation 206).

The NVM data is loaded into operational RAM 108 (operation 208). The EBL validates the NVM data by calculating a type-level hash of each NVM data (operation 210) and comparing the type-level hash to the hash value stored in NVRAM (operation 212). If there is a discrepancy between the hash values, then a check is made of whether the NVRAM is empty (operation 214). In the case of a virgin boot (e.g., the first time the modem has operated), then there are no hash values stored in the modem's NVRAM. In this instance, the type-level hash values calculated at operation 210 are stored in the NVRAM (operation 216). If instead there is a mismatch between the hash values, then an error may be raised or operation halted (operation 218).

If the hash values match or in the case of virgin boot, then the system allows the software image to continue to execute (operation 220). While the software image is executing, the modem may send and receive data. This operation results in updates to the NVM data (operation 222). For example, information may be received from a local cellular tower indicating the modem's location, the cellular tower's identity, etc. This data may be stored in the dynamic NVM data type. At some interval, the NVM data in the operational RAM is synchronized with the AP (operation 224). The interval may be relatively long in order to preserve power on the AP-side. For example, the AP may be designed to sleep or operate at a reduced power level. Waking the AP every 500ms for a data push is inefficient. So a longer update interval, such as multiple hours, may be used. Special events like calibration complete, system reset, or shutdown may also be used to trigger the update.

Figure 3:
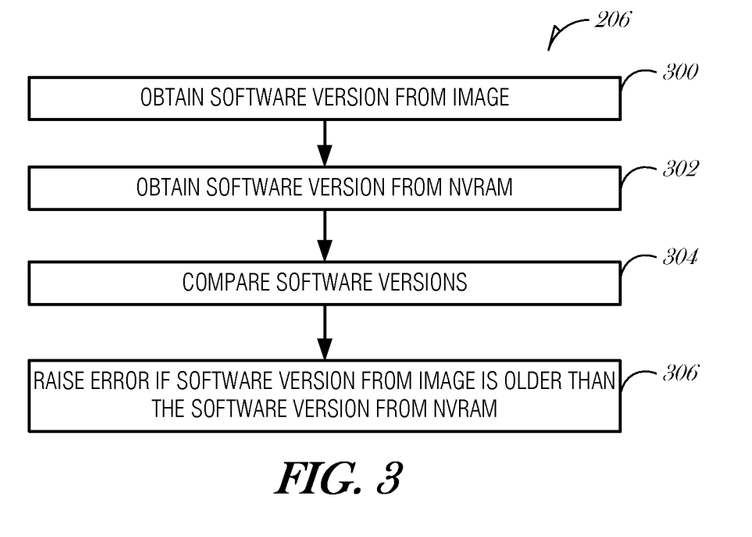
FIG. 3 is a flowchart illustrating control and data flow during modem operation, according to an embodiment.

FIG. 3 is a flowchart illustrating control and data flow during modem operation, according to an embodiment. The process illustrated in FIG. 3 is a software image validation process (e.g., operation 206 of FIG. 2). The process 206 relies on the use of the software version field 116 in the NVRAM 106. As part of the validation process, the modem system 102 restricts use of software that is older than the version stored in the software version field 116. This is generally referred to as "rollback protection." For instance, software updates may be rolled out to address various security concerns. Allowing software to be rolled back to a previous version may expose the modem system 102 or other components to security breaches. Using rollback protection ensures that the software is at least as current as the last software that executed on the modem system 102. Thus, the software image validation process obtains the software version from the software image (operation 300). The software version field 116 is accessed and the software version of the last-executed software image is obtained (operation 302). A comparison of these values is then used to ensure that the software version from the image is at least recent as the version from NVRAM (operation 304). An error may be raised or execution of the software, EBL, or other processes may be halted if the software image is too old.

Figure 4:
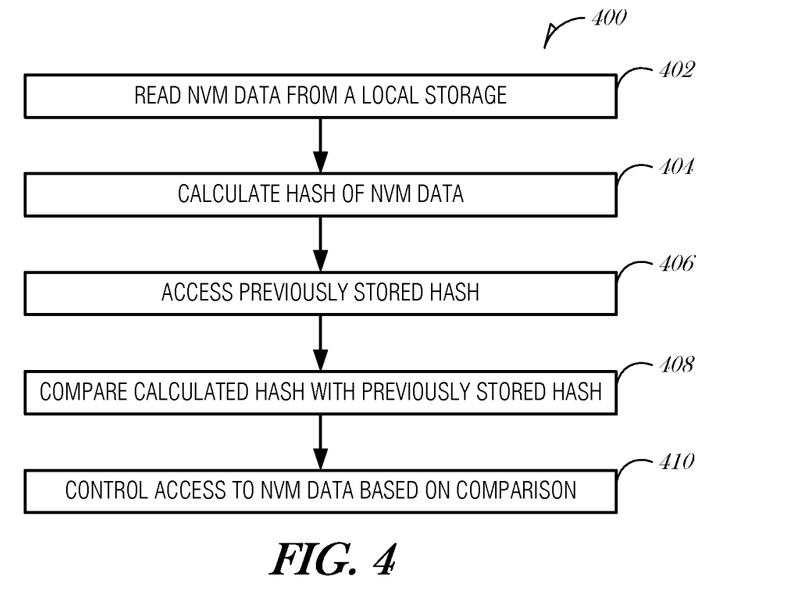
FIG. 4 is a flowchart illustrating a method of implementing additional security in a flashless modem, according to an embodiment.

FIG. 4 is a flowchart illustrating a method 400 of implementing additional security in a flashless modem, according to an embodiment. At block 402, non-volatile memory data (NVM data) is read from a local storage by a modem system. In an embodiment, the NVM data is one of three types of NVM data. In a further embodiment, the three types of NVM data include configuration, static, and dynamic NVM data. As discussed above, configuration data may include calibration data and security data.

In an embodiment, the local storage includes a random access memory (RAM). The local storage may be referred to as the operational RAM 108.

At block 404, a hash of the NVM data is calculated. In an embodiment, calculating the hash of the NVM data comprises calculating a 512-bit hash of the NVM data.

At block 406, a previously-stored hash is accessed. The previously-stored hash may be stored in any secure location, such as non-volatile random access memory at the modem system or the like. In an embodiment, accessing the previously-stored hash comprises accessing a non-volatile random access memory (NVRAM) of the modem system. In an embodiment, the NVRAM of the modem system includes 200 bytes of storage. The 200 bytes of storage may include 64 bytes of storage for each of three types of NVM data (for a total of 192 bytes) and 8 bytes of storage for a software version.

At block 408, the hash of the NVM data is compared with the previously-stored hash to produce a comparison.

At block 410, access to the NVM data is controlled based on the comparison.

In an embodiment, the method 400 includes obtaining a software version associated with the NVM data; accessing a previously-stored software version from a NVRAM of the modem system; and comparing the software version associated with the NVM data with the previously-stored software version. In an embodiment, the method 400 includes denying use of the NVM data when the software version associated with the NVM data is older than the previously-stored software version. For example, the software image may be prohibited from executing with the NVM data.

In an embodiment, the method 400 includes receiving the NVM data from a memory storage of an application processor during a boot sequence of the modem system. The NVM data may be received by a memory-to-memory copy. After boot and during operation, the method 400 includes updating the NVM data during operation of the modem system to produce updated NVM data; calculating a group-based hash of the updated NVM data; and periodically or intermittently copying the updated NVM data and the group-based hash to the memory storage of the application processor. The group-based hash is a hash value for the group of NVM data, which includes the three types of NVM data (e.g., configuration, static, dynamic).

In an embodiment, the method 400 includes calculating an NVM data type-level hash of a type of the NVM data; and storing the NVM data type-level hash in the NVRAM, replacing the previously-stored hash. The NVM data type is one of configuration, static, or dynamic, and the NVM data type-level hash is a hash calculated from the values of all NVM data of a certain type.

Figure 5:
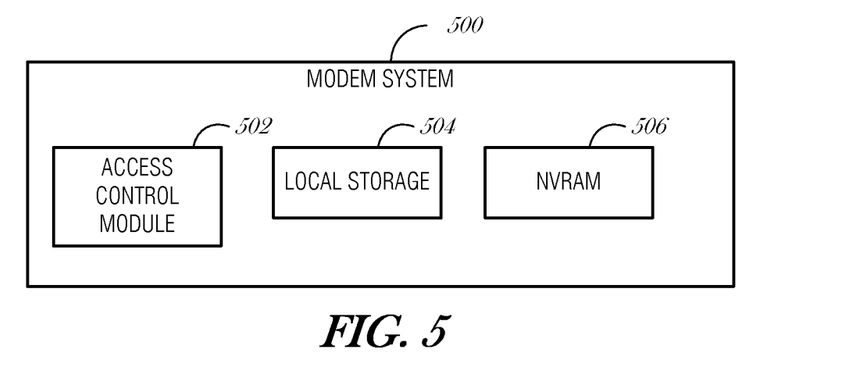
FIG. 5 is a block diagram illustrating a modem system for implementing additional security in a flashless modem, according to an embodiment.

FIG. 5 is a block diagram illustrating a modem system 500 for implementing additional security in a flashless modem, according to an embodiment. The modem system 500 includes an access control module 502, a local storage 504, and non-volatile random access memory (NVRAM) 506. The access control module 502 may be configured is to read non-volatile memory data (NVM data) from the local storage 504. In an embodiment, the local storage 504 includes a random access memory (RAM).

The access control module 502 may further be configured to calculate a hash of the NVM data. In an embodiment, the NVM data is one of three types of NVM data. In a further embodiment, the three types of NVM data include configuration, static, and dynamic NVM data. In an embodiment, to calculate the hash of the NVM data, the access control module 502 is to calculate a 512-bit hash of the NVM data.

The access control module 502 may further be configured to access a previously-stored hash. In an embodiment, to access the previously-stored hash, the access control module 502 is to access the NVRAM 506 of the modem system.

In an embodiment, the NVRAM 506 of the modem system includes 200 bytes of storage. In an embodiment, the 200 bytes of storage include 64 bytes of storage for each of three types of NVM data (for a total of 192 bytes) and 8 bytes of storage for a software version.

The access control module 502 may further be configured to compare the hash of the NVM data with the previously-stored hash to produce a comparison, and control access to the NVM data based on the comparison.

In an embodiment, the access control module 502 is to obtain a software version associated with the NVM data, access a previously-stored software version from the NVRAM 506 of the modem system, and compare the software version associated with the NVM data with the previously-stored software version. In an embodiment, the access control module 502 is to deny use of the NVM data when the software version associated with the NVM data is older than the previously-stored software version.

In an embodiment, the access control module 502 is to receive the NVM data from a memory storage of an application processor during a boot sequence of the modem system. In a further embodiment, the access control module 502 is to update the NVM data during operation of the modem system to produce updated NVM data; calculate a group-based hash of the updated NVM data; and periodically or intermittently copy the updated NVM data and the group-based hash to the memory storage of the application processor. In a further embodiment, the access control module 502 is to calculate an NVM data type-level hash of a type of the NVM data; and store the NVM data type-level hash in the NVRAM 506, replacing the previously-stored hash.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
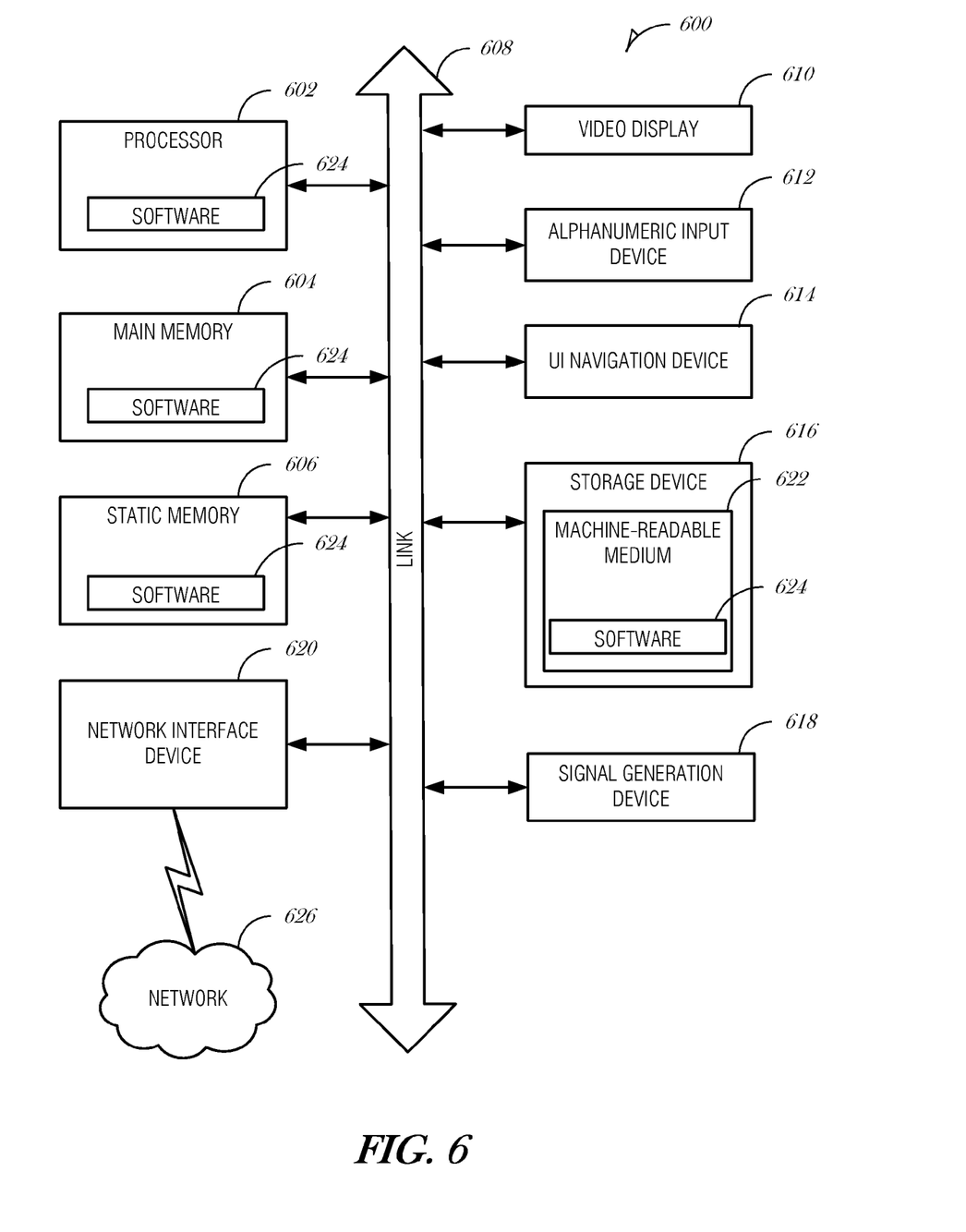
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for implementing additional security in a flashless modem (such as a device, apparatus, or machine) comprising: local storage; non-volatile random access memory (NVRAM); and an access control module to: read non-volatile memory data (NVM data) from the local storage; calculate a hash of the NVM data; access a previously-stored hash; compare the hash of the NVM data with the previously-stored hash to produce a comparison; and control access to the NVM data based on the comparison.

In Example 2, the subject matter of Example 1 may include, wherein the NVM data is one of three types of NVM data.

In Example 3, the subject matter of any one of Examples 1 to 2 may include, wherein the three types of NVM data include configuration, static, and dynamic NVM data.

In Example 4, the subject matter of any one of Examples 1 to 3 may include, wherein the local storage includes a random access memory (RAM).

In Example 5, the subject matter of any one of Examples 1 to 4 may include, wherein to calculate the hash of the NVM data, the access control module is to calculate a 512-bit hash of the NVM data.

In Example 6, the subject matter of any one of Examples 1 to 5 may include, wherein to access the previously-stored hash, the access control module is to access the NVRAM of the modem system.

In Example 7, the subject matter of any one of Examples 1 to 6 may include, wherein the NVRAM of the modem system includes 200 bytes of storage.

In Example 8, the subject matter of any one of Examples 1 to 7 may include, wherein the 200 bytes of storage include 64 bytes of storage for each of three types of NVM data and 8 bytes of storage for a software version.

In Example 9, the subject matter of any one of Examples 1 to 8 may include, wherein the access control module is to: obtain a software version associated with the NVM data; access a previously-stored software version from the NVRAM of the modem system; and compare the software version associated with the NVM data with the previously-stored software version.

In Example 10, the subject matter of any one of Examples 1 to 9 may include, wherein the access control module is to deny use of the NVM data when the software version associated with the NVM data is older than the previously-stored software version.

In Example 11, the subject matter of any one of Examples 1 to 10 may include, wherein the access control module is to receive the NVM data from a memory storage of an application processor during a boot sequence of the modem system.

In Example 12, the subject matter of any one of Examples 1 to 11 may include, wherein the access control module is to: update the NVM data during operation of the modem system to produce updated NVM data; calculate a group-based hash of the updated NVM data; and periodically or intermittently copy the updated NVM data and the group-based hash to the memory storage of the application processor.

In Example 13, the subject matter of any one of Examples 1 to 12 may include, wherein the access control module is to: calculate an NVM data type-level hash of a type of the NVM data; and store the NVM data type-level hash in the NVRAM, replacing the previously-stored hash.

Example 14 includes subject matter for implementing additional security in a flashless modem (such as a method, means for performing acts, machine readable medium including instructions that when performed by a machine cause the machine to performs acts, or an apparatus to perform) comprising: reading, by a modem system, non-volatile memory data (NVM data) from a local storage; calculating a hash of the NVM data; accessing a previously-stored hash; comparing the hash of the NVM data with the previously-stored hash to produce a comparison; and controlling access to the NVM data based on the comparison.

In Example 15, the subject matter of Example 14 may include, wherein the NVM data is one of three types of NVM data.

In Example 16, the subject matter of any one of Examples 14 to 15 may include, wherein the three types of NVM data include configuration, static, and dynamic NVM data.

In Example 17, the subject matter of any one of Examples 14 to 16 may include, wherein the local storage includes a random access memory (RAM).

In Example 18, the subject matter of any one of Examples 14 to 17 may include, wherein calculating the hash of the NVM data comprises calculating a 512-bit hash of the NVM data.

In Example 19, the subject matter of any one of Examples 14 to 18 may include, wherein accessing the previously-stored hash comprises accessing a non-volatile random access memory (NVRAM) of the modem system.

In Example 20, the subject matter of any one of Examples 14 to 19 may include, wherein the NVRAM of the modem system includes 200 bytes of storage.

In Example 21, the subject matter of any one of Examples 14 to 20 may include, wherein the 200 bytes of storage include 64 bytes of storage for each of three types of NVM data and 8 bytes of storage for a software version.

In Example 22, the subject matter of any one of Examples 14 to 21 may include, obtaining a software version associated with the NVM data; accessing a previously-stored software version from a NVRAM of the modem system; and comparing the software version associated with the NVM data with the previously-stored software version.

In Example 23, the subject matter of any one of Examples 14 to 22 may include, denying use of the NVM data when the software version associated with the NVM data is older than the previously-stored software version.

In Example 24, the subject matter of any one of Examples 14 to 23 may include, receiving the NVM data from a memory storage of an application processor during a boot sequence of the modem system.

In Example 25, the subject matter of any one of Examples 14 to 24 may include, updating the NVM data during operation of the modem system to produce updated NVM data; calculating a group-based hash of the updated NVM data; and periodically or intermittently copying the updated NVM data and the group-based hash to the memory storage of the application processor.

In Example 26, the subject matter of any one of Examples 14 to 25 may include, calculating an NVM data type-level hash of a type of the NVM data; and storing the NVM data type-level hash in the NVRAM, replacing the previously-stored hash.

Example 27 includes at least one machine-readable medium including instructions, which when executed by a machine, cause the machine to perform operations of any of the Examples 14-26.

Example 28 includes an apparatus comprising means for performing any of the Examples 14-26.

Example 29 includes subject matter for implementing additional security in a flashless modem (such as a device, apparatus, or machine) comprising: means for reading, by a modem system, non-volatile memory data (NVM data) from a local storage; means for calculating a hash of the NVM data; means for accessing a previously-stored hash; means for comparing the hash of the NVM data with the previously-stored hash to produce a comparison; and means for controlling access to the NVM data based on the comparison.

In Example 30, the subject matter of Example 29 may include, wherein the NVM data is one of three types of NVM data.

In Example 31, the subject matter of any one of Examples 29 to 30 may include, wherein the three types of NVM data include configuration, static, and dynamic NVM data.

In Example 32, the subject matter of any one of Examples 29 to 31 may include, wherein the local storage includes a random access memory (RAM).

In Example 33, the subject matter of any one of Examples 29 to 32 may include, wherein the means for calculating the hash of the NVM data comprise means for calculating a 512-bit hash of the NVM data.

In Example 34, the subject matter of any one of Examples 29 to 33 may include, wherein the means for accessing the previously-stored hash comprise means for accessing a non-volatile random access memory (NVRAM) of the modem system.

In Example 35, the subject matter of any one of Examples 29 to 34 may include, wherein the NVRAM of the modem system includes 200 bytes of storage.

In Example 36, the subject matter of any one of Examples 29 to 35 may include, wherein the 200 bytes of storage include 64 bytes of storage for each of three types of NVM data and 8 bytes of storage for a software version.

In Example 37, the subject matter of any one of Examples 29 to 36 may include, means for obtaining a software version associated with the NVM data; means for accessing a previously-stored software version from a NVRAM of the modem system; and means for comparing the software version associated with the NVM data with the previously-stored software version.

In Example 38, the subject matter of any one of Examples 29 to 37 may include, means for denying use of the NVM data when the software version associated with the NVM data is older than the previously-stored software version.

In Example 39, the subject matter of any one of Examples 29 to 38 may include, means for receiving the NVM data from a memory storage of an application processor during a boot sequence of the modem system.

In Example 40, the subject matter of any one of Examples 29 to 39 may include, means for updating the NVM data during operation of the modem system to produce updated NVM data; means for calculating a group-based hash of the updated NVM data; and means for periodically or intermittently copying the updated NVM data and the group-based hash to the memory storage of the application processor.

In Example 41, the subject matter of any one of Examples 29 to 40 may include, means for calculating an NVM data type-level hash of a type of the NVM data; and means for storing the NVM data type-level hash in the NVRAM, replacing the previously-stored hash.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A modem system for implementing additional security in a flashless modem, the modem system comprising:
   local storage;
   non-volatile random access memory (NVRAM); and
   an access control module implemented by a hardware processor to:
      read non-volatile memory data (NVM data) from the local storage;
      calculate a hash of the NVM data;
      access a previously-stored hash;
      compare the hash of the NVM data with the previously-stored hash to produce a comparison;
      control access to the NVM data based on the comparison;
      update the NVM data during operation of the modem system to produce updated NVM data;
      calculate a group-based hash of the updated NVM data; and periodically or intermittently copy the updated NVM data and the group-based hash to the memory storage of the application processor.

2. The modem system of claim 1, wherein the NVM data is one of three types of NVM data.

3. The modem system of claim 2, wherein the three types of NVM data include configuration, static, and dynamic NVM data.

4. The modem system of claim 1, wherein the local storage includes a random access memory (RAM).

5. The modem system of claim 1, wherein to calculate the hash of the NVM data, the access control module is to calculate a 512-bit hash of the NVM data.

6. The modem system of claim 1, wherein to access the previously-stored hash, the access control module is to access the NVRAM of the modem system.

7. The modem system of claim 1, wherein the NVRAM of the modem system includes 200 bytes of storage.

8. The modem system of claim 7, wherein the 200 bytes of storage include 64 bytes of storage for each of three types of NVM data and 8 bytes of storage for a software version.

9. The modem system of claim 1, wherein the access control module is to:
obtain a software version associated with the NVM data;
access a previously-stored software version from the NVRAM of the modem system; and
compare the software version associated with the NVM data with the previously-stored software version.

10. The modem system of claim 9, wherein the access control module is to deny use of the NVM data when the software version associated with the NVM data is older than the previously-stored software version.

11. At least one non-transitory machine-readable medium including instructions, which when executed by a machine, cause the machine to:
read, by a modem system, non-volatile memory data (NVM data) from a local storage;
calculate a hash of the NVM data;
access a previously-stored hash;
compare the hash of the NVM data with the previously-stored hash to produce a comparison;
control access to the NVM data based on the comparison;
update the NVM data during operation of the modem system to produce updated NVM data;
calculate a group-based hash of the updated NVM data and
periodically or intermittently copy the updated NVM data and the group-based hash to the memory storage of the application processor.

12. The at least one machine-readable medium of claim 11, wherein the NVM data is one of three types of NVM data including configuration, static, and dynamic NVM data.

13. The at least one machine-readable medium of claim 11, wherein the local storage includes a random access memory (RAM).

14. The at least one machine-readable medium of claim 11, wherein the instructions to calculate the hash of the NVM data comprise instructions to calculate a 512-bit hash of the NVM data.

15. The at least one machine-readable medium of claim 11, wherein the instructions to access the previously-stored hash comprise instructions to access a non-volatile random access memory (NVRAM) of the modem system.

16. The at least one machine-readable medium of claim 11, wherein the NVRAM of the modem system includes 200 bytes of storage.

17. The at least one machine-readable medium of claim 16, wherein the 200 bytes of storage include 64 bytes of storage for each of three types of NVM data and 8 bytes of storage for a software version.

18. The at least one machine-readable medium of claim 11, further comprising instructions to:
obtain a software version associated with the NVM data;
access a previously-stored software version from a NVRAM of the modem system; and
compare the software version associated with the NVM data with the previously-stored software version.

19. The at least one machine-readable medium of claim 18, further comprising denying use of the NVM data when the software version associated with the NVM data is older than the previously-stored software version.

20. The at least one machine-readable medium of claim 11, further comprising instructions to receive the NVM data from a memory storage of an application processor during a boot sequence of the modem system.

21. The at least one machine-readable medium of claim 11, further comprising:
calculate an NVM data type-level hash of a type of the NVM data; and
store the NVM data type-level hash in the NVRAM, replacing the previously-stored hash.

22. A method of implementing additional security in a flashless modem, the method comprising:
reading, by a modem system, non-volatile memory data (NVM data) from a local storage;
calculating a hash of the NVM data;
accessing a previously-stored hash;
comparing the hash of the NVM data with the previously-stored hash to produce a comparison;
controlling access to the NVM data based on the comparison;
updating the NVM data during operation of the modem system to produce updated NVM data;
calculating a group-based hash of the updated NVM data; and
periodically or intermittently copying the updated NVM data and the group-based hash to the memory storage of the application processor.

23. The method of claim 22, wherein accessing the previously-stored hash comprises accessing a non-volatile random access memory (NVRAM) of the modem system.

* * * * *

UNITED STATES PATENT AND TRADEMARK OFFICE
CERTIFICATE OF CORRECTION

PATENT NO. : 9,594,699 B2
APPLICATION NO. : 14/664507
DATED : March 14, 2017
INVENTOR(S) : Pedersen et al.

Page 1 of 1

It is certified that error appears in the above-identified patent and that said Letters Patent is hereby corrected as shown below:

In the Claims

In Column 13, Line 46, in Claim 11, delete "data" and insert --data;-- therefor

Signed and Sealed this
Fifth Day of January, 2021

Andrei Iancu
*Director of the United States Patent and Trademark Office*